(12) United States Patent
Dai et al.

(10) Patent No.: US 12,438,466 B2
(45) Date of Patent: Oct. 7, 2025

(54) INTEGRATED CIRCUIT CONTROL DEVICE FOR MULTI-PHASE SWITCHING CONVERTERS AND CONTROL METHOD THEREOF

(71) Applicant: Chengdu Monolithic Power Systems Co., Ltd., Chengdu (CN)

(72) Inventors: Huichun Dai, Hangzhou (CN); Wangmiao Hu, Hangzhou (CN); Fangyu Zhang, Hangzhou (CN); Keke Zhao, Hangzhou (CN); Lijie Jiang, Hangzhou (CN); Jinghai Zhou, Kirkland, WA (US)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 365 days.

(21) Appl. No.: 18/298,187

(22) Filed: Apr. 10, 2023

(65) Prior Publication Data

US 2023/0336082 A1 Oct. 19, 2023

(30) Foreign Application Priority Data

Apr. 14, 2022 (CN) .......................... 202210393099.0

(51) Int. Cl.
*H02M 3/158* (2006.01)
*H02M 1/00* (2006.01)
*H02M 1/32* (2007.01)

(52) U.S. Cl.
CPC ....... *H02M 3/1586* (2021.05); *H02M 1/0009* (2021.05); *H02M 1/32* (2013.01); *H02M 1/327* (2021.05)

(58) Field of Classification Search
CPC .. H02M 3/1586; H02M 1/0009; H02M 1/325; H02M 1/327; H02M 1/32
See application file for complete search history.

(56) References Cited

U.S. PATENT DOCUMENTS

| | | | | |
|---|---|---|---|---|
| 7,759,918 | B2 * | 7/2010 | Moyer | H02M 3/1584 323/272 |
| 8,358,113 | B2 * | 1/2013 | Cheng | H02J 1/102 323/272 |
| 10,243,465 | B1 * | 3/2019 | Young | H02M 1/14 |
| 10,270,343 | B2 * | 4/2019 | Nguyen | H02M 3/1584 |
| 10,727,746 | B1 * | 7/2020 | Yen | H02M 3/1584 |
| 11,031,868 | B2 * | 6/2021 | Cheng | H02M 3/1584 |
| 11,303,204 | B1 * | 4/2022 | Zhao | H02M 3/1588 |

(Continued)

*Primary Examiner* — Yusef A Ahmed
(74) *Attorney, Agent, or Firm* — Perkins Coie LLP

(57) ABSTRACT

An integrated circuit (IC) control device for a multi-phase switching converter having a master phase and at least one slave phase, has a first ON-time control circuit to provide a first ON-time control signal and at least one slave ON-time control circuit. Each slave ON-time control circuit has a closed-loop gainer to provide a gain by executing proportional integral to a difference between a master phase temperature and a slave phase temperature, a multiplier to provide a current feedback signal by multiplying a slave current signal with the gain, a bias circuit to provide a bias by executing proportional integral to a difference between a master phase current and the current feedback signal, and an adder to provide a corresponding slave ON-time control signal by adding the first ON-time control signal to a bias ON-time control signal provided by a bias ON-time generator based the bias.

20 Claims, 9 Drawing Sheets

(56) References Cited

U.S. PATENT DOCUMENTS

| | | | |
|---|---|---|---|
| 11,791,705 B1* | 10/2023 | Chang | H02M 1/0041 363/65 |
| 2002/0125869 A1* | 9/2002 | Groom | H02M 3/1584 323/283 |
| 2010/0164454 A1* | 7/2010 | Rinne | H02M 3/1584 323/282 |
| 2011/0057632 A1* | 3/2011 | Cheng | H02M 3/156 323/234 |
| 2012/0091977 A1* | 4/2012 | Carroll | H02M 3/1584 323/271 |
| 2013/0057239 A1* | 3/2013 | Kalje | H02M 3/1584 323/271 |
| 2013/0169249 A1* | 7/2013 | Lee | H02M 3/1584 323/272 |
| 2013/0307498 A1* | 11/2013 | Jiang | G05F 1/10 323/271 |
| 2013/0307503 A1* | 11/2013 | Ouyang | G05F 1/10 323/282 |
| 2013/0342176 A1* | 12/2013 | Yang | H02M 3/1584 323/234 |
| 2014/0022684 A1* | 1/2014 | Jiang | H02M 3/1584 361/93.1 |
| 2015/0207400 A1* | 7/2015 | Shenoy | H02M 3/1584 323/213 |
| 2015/0270773 A1* | 9/2015 | Jiang | H02M 1/32 323/234 |
| 2016/0164414 A1* | 6/2016 | Hang | H02M 3/1584 323/271 |
| 2018/0278162 A1* | 9/2018 | Petricek | H02M 3/1584 |
| 2018/0294720 A1* | 10/2018 | Zhu | G01K 13/00 |
| 2019/0074770 A1* | 3/2019 | Trichy | H02M 1/42 |
| 2019/0207518 A1* | 7/2019 | Wu | G01R 29/033 |
| 2021/0028683 A1* | 1/2021 | Jiang | H02M 1/084 |
| 2021/0028686 A1* | 1/2021 | Jiang | H02M 3/1584 |
| 2021/0028704 A1* | 1/2021 | Jiang | H02M 3/1584 |
| 2021/0288578 A1* | 9/2021 | Luo | H02M 1/088 |
| 2021/0399641 A1* | 12/2021 | Lee | H02M 1/08 |
| 2022/0057855 A1* | 2/2022 | Zou | G06F 1/32 |
| 2022/0247316 A1* | 8/2022 | Jiang | H02M 3/1584 |
| 2022/0247317 A1* | 8/2022 | Jiang | H02M 3/1584 |
| 2022/0345126 A1* | 10/2022 | Harriman | H03K 17/145 |
| 2023/0048949 A1* | 2/2023 | Nguyen | H02M 1/0043 |
| 2023/0402925 A1* | 12/2023 | Chang | H02M 3/1584 |
| 2024/0297566 A1* | 9/2024 | Kv | H02M 1/0025 |

* cited by examiner

INTEGRATED CIRCUIT CONTROL DEVICE FOR MULTI-PHASE SWITCHING CONVERTERS AND CONTROL METHOD THEREOF

CROSS-REFERENCE TO RELATED APPLICATIONS

This application claims the benefit of CN application No. 202210393099.0, filed on Apr. 14, 2022, and incorporated herein by reference.

TECHNICAL FIELD OF THE INVENTION

The present invention generally relates to electronic circuits, and more particularly but not exclusively, to control devices for multi-phase switching converters with thermal balance and associated control methods.

BACKGROUND OF THE INVENTION

Multiphase switching converters are widely used in high-performance CPU power supply solutions due to their superior performance. The operating temperature of each switching phase in the multiphase switching converter should be equal, and the overheating operation of any switching phase will make the operation of the switching converter unstable, and even cause the entire switching converter to be turned off.

Traditionally, multiphase switching converters achieve thermal balance through phase current balance loop. Ideally, when the phase currents among phases are equal, their power losses and their temperature rise should also be equal. However, power demand can vary widely during use, and to meet these swings in power requirements, the phases of the multi-phase converter may be added and shed to regulate an amount of total current. For example, there can be one, two, three or more switching phases based on power demand of the electronic device application. Therefore, the thermal balance design for the multi-phase switching converters with phase shedding and/or adding operation becomes more complex.

SUMMARY OF THE INVENTION

An embodiment of the present invention discloses an integrated circuit (IC) control device used in a multi-phase switching converter for providing an output voltage to a load. The multi-phase switching converter has a first phase having a first switch and a second phase having a second switch. The control device comprises a first pin, a second pin, a third pin, a comparison circuit, a first ON-time control circuit and a second ON-time control circuit. Wherein the first pin is configured to receive a first temperature signal representative of the temperature of the first phase and a second temperature signal representative of the temperature of the second phase. The second pin is configured to receive a first current signal representative of a current flowing through the first switch. The third pin is configured to receive a second current signal representative of a current flowing through the second switch. The comparison circuit is configured to provide a comparison signal by comparing a feedback voltage representative of the output voltage with a reference voltage. The first ON-time control circuit is configured to provide a first ON-time control signal to control the ON-time of the first switch. The second ON-time control circuit is configured to provide a second ON-time control signal to control the ON-time of the second switch based on the first temperature signal, the second temperature signal, the first current signal, the second current signal and the first ON-time control signal.

Another embodiment of the present invention discloses a control device used in a multi-phase switching converter. The multi-phase switching converter has a plurality of switching phases coupled in parallel for providing an output voltage to a load. The plurality of switching phases has a master phase and at least one slave phase. The control device comprises: a master ON-time control circuit configured to provide a first ON-time control signal to control the ON-time of a first switch in the master phase, and at least one slave ON-time control circuit, each slave ON-time control circuit is configured to provide a respective slave ON-time control signal to control the ON-time of a slave switch in a corresponding slave phase.

Yet another embodiment of the present invention discloses a control method used in a multi-phase switching converter having a plurality of switching phases for providing an output voltage to a load. The plurality of switching phases has a master phase and at least one slave phase. The control method comprising: a first ON-time control signal is provided to control the ON-time of a first switch in the master phase, and a respective slave ON-time control signal is provided to control the ON-time of a slave switch in each slave phase. Wherein in each slave phase, a first temperature signal representative of a master phase temperature and a slave temperature signal representative of the temperature of the corresponding slave phase are received, and a gain is provided by executing proportional integral operation to a difference between the first temperature signal and the slave temperature signal. A product of a slave current signal representative of a current flowing through the slave switch and the gain is provided as a current feedback signal. A bias is provided by executing proportional integral operation to a difference between a first current signal representative of a current flowing through the first switch and the current feedback signal. A bias ON-time control signal is generated based on the bias. And the slave ON-time control signal for the slave switch in the corresponding slave phase is provided by adding the first ON-time control signal to the bias ON-time control signal.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
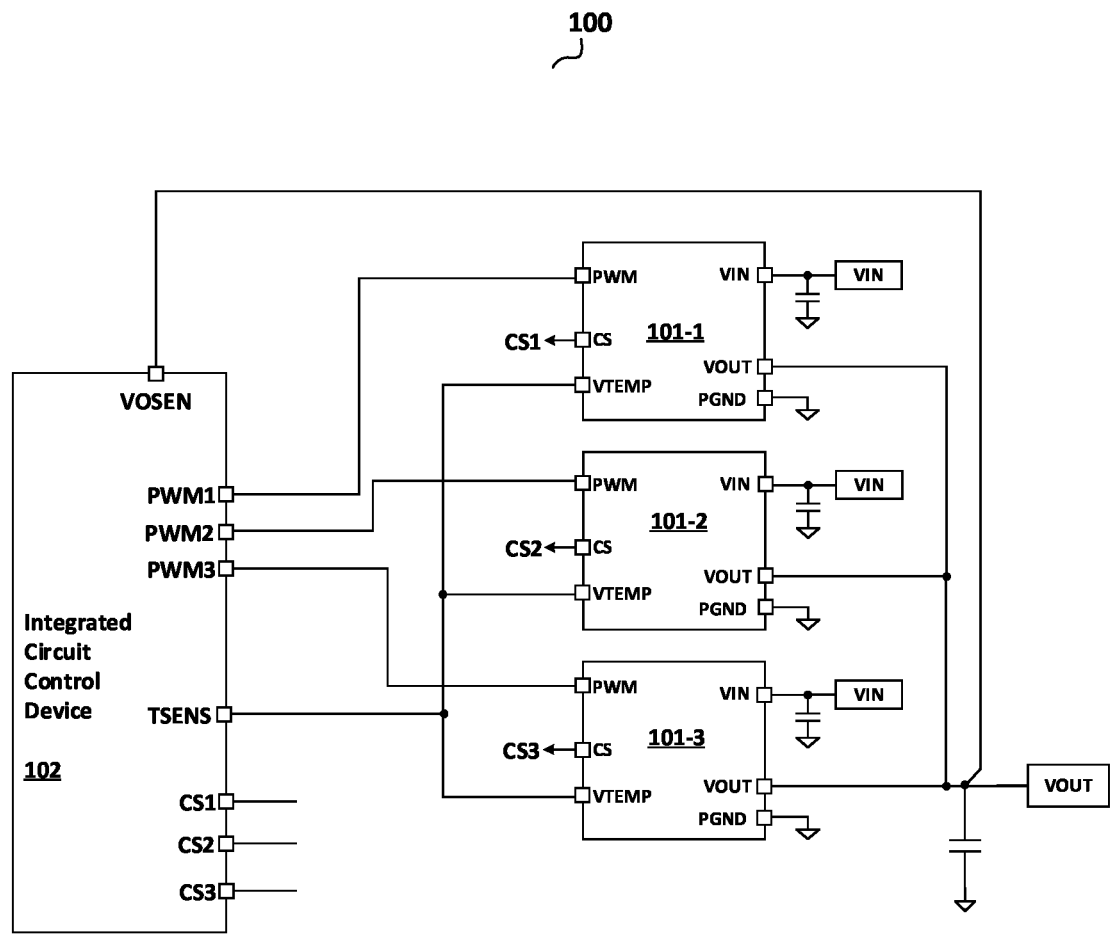
FIG. 1 shows a block diagram of a multi-phase switching converter 100 in accordance with an embodiment of the present invention.

FIG. 1 shows a block diagram of a multi-phase switching converter 100 in accordance with an embodiment of the present invention. The multi-phase converter 100 can be employed in any electronic device that can require an output voltage. In the example of FIG. 1, the multi-phase switching converter 100 comprises a plurality of switching phases 101 and an integrated circuit (IC) control device 102. The plurality of switching phases 101 are coupled in parallel for converting an input voltage VIN to an output voltage VOUT which is provided a load. The plurality of switching phases 101 has a first phase (101-1) configured as a master phase and other phases (101-2, 101-3) configured as slave phases, may adopt any direct current (DC/DC) topology, such as step-up converter, step-down converter, forward converter, and flyback converter and so on.

In the example shown in FIG. 1, the plurality of switching phases 101 comprises a first IC switch device 101-1 configured as the master phase, a second IC switch device 101-2 and a third IC switch device 101-3 configured as the slave phases. The plurality of switching phases 101 includes three monolithic switch devices to form a three-phase switching converter for illustration purpose. As can be appreciated, the plurality of switching phases 101 can also include IC switch devices with any number to form any other multi-phase switching converter.

Each IC switch device (e.g., 101-1) comprises a plurality of pins that comprises a VIN pin for receiving the input voltage, a VOUT pin for providing the output voltage, a CS pin for reporting a current flowing through a power switch the IC switch device, a VTEMP pin for reporting temperature information of the IC switch device, and a PWM pin for receiving a switching control signal for controlling the power switch in the IC switch device.

Each of the plurality of switch devices (101-1, 101-2, and 101-3) comprises a respective power switch. The power switch can have a first terminal connected to the VIN pin and a second terminal connected to the VOUT pin through an energy storage element when the IC switch device is turned ON under power operation. The CS pin is configured to provide a current signal representative of a current flowing through the energy storage element or the power switch. The pin VTEMP is configured to provide a temperature signal representative of the temperature of the monolithic IC switch device based on a junction temperature (i.e., die temperature) of the monolithic IC switch device. Since the hot spots along the IC switch device usually appears in the power switch, the pin VTEMP can provide the temperature signal by sensing the temperature of the power switch.

In the example shown in FIG. 1, the IC control device 102 comprises a plurality of pins that comprises a TENSE pin, CS1~CS3 pins, PWM1~PWM3 pins for providing the switching control signals to the IC switch devices 101-1~101-3, and a VOSEN pin for receiving the output voltage VOUT of the multi-phase switching converter 100. The TSENS pin of the IC control device 102 is coupled to each VTEMP pin of the plurality of the monolithic IC switch devices 101-1~101-3, to successively receive a plurality of temperature signals t1~t3. In one embodiment, the TENSE pin is further configured to report a fault information based on the received plurality of temperature signals. The CS1~CS3 pins of the control device 102 are respectively coupled to the CS pin of the plurality of IC switch devices (101-1~101-3), to receive the current information, respectively.

Figure 2:
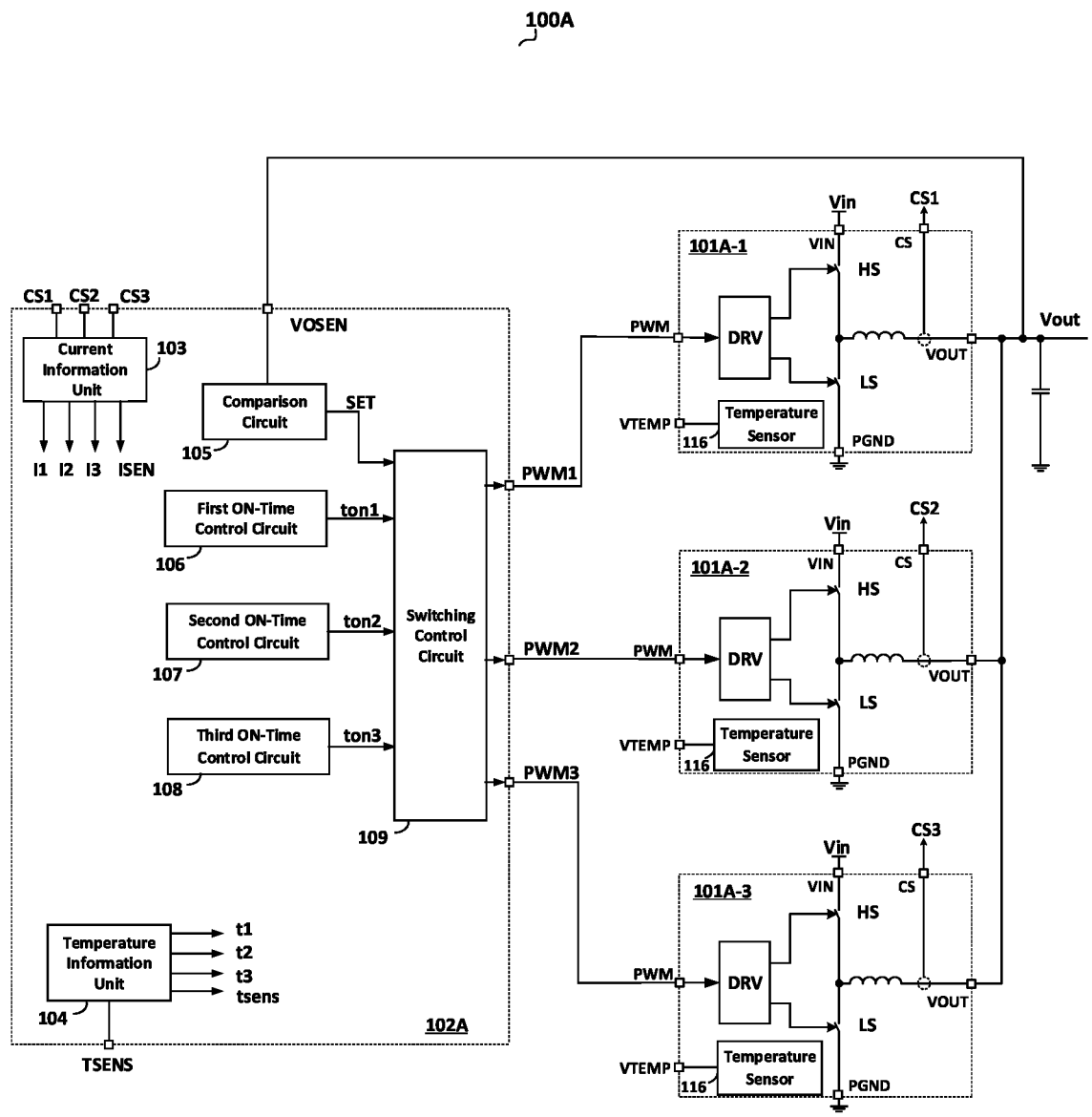
FIG. 2 shows a schematic diagram of a multi-phase switching converter 100A in accordance with an embodiment of the present invention.

FIG. 2 shows a schematic diagram of a multi-phase switching converter 100A in accordance with an embodiment of the present invention. As shown in FIG. 2, the multi-phase switching converter 100A comprises a plurality of switching phases 101A and an IC control device 102A. In the example shown in FIG. 2, the plurality of switching phases 101A comprises the plurality of IC switch devices. The plurality of IC switch devices comprises a first IC switch device 101A-1 configured as a master phase, a second IC switch device 101A-2 and a third IC switch device 101A-3 configured as two slave phases.

Each of the plurality of IC switch devices could be configured to have same circuit topology. In one embodiment, each IC switch device comprises a VIN pin, a VOUT pin, a CS pin for reporting the current information, a VTEMP pin for reporting the junction temperature as a temperature reading, a PWM pin for receiving a switching control signal, at least one power switch (e.g., a high side switch HS and a low side switch LS), a driver circuit DRV and a temperature sensor 116. The driver circuit DRV is configured to drive the power switch for turning the power switch ON and OFF in a controlled manner. The temperature sensor 116 may be, but is not limited to, an integrated solid state current modulating sensor or a thermistor. The temperature sensor 116 monitors the temperature of the IC switch device, and periodically reports the temperature readings to a temperature information unit 104 through the connection between the VTEMP pin of the IC switch device (e.g., 101A-1) and the TSENS pin of the IC control device 102A. In one embodiment, the temperature reading is a voltage signal that is proportional to the junction temperature (e.g., 10 mV/° C.). In another embodiment, the temperature reading is a sum of the voltage signal proportional to the junction temperature and a sensing offset voltage.

In the example shown in FIG. 2, the IC control device 102A at least comprises a plurality of pins that comprises a TENSE pin, CS1~CS3 pins, PWM1~PWM3 pins for providing the switching control signals and a VOSEN pin for receiving a feedback voltage representative of the output voltage VOUT of the multi-phase switching converter 100A. Besides, the IC control device 102A further comprises a current information unit 103, the temperature information unit 104, a comparison circuit 105, a first ON-time control circuit 106, a second ON-time control circuit 107, a third ON-time control circuit 108 and a switching control circuit 109.

The pins CS1~CS3 of the IC control device 102A are coupled to the CS pin of the IC switch devices (101A-1~101A-3), to receive the current information from CS pin of the IC switch devices, respectively. The current information unit 103 is configured to provide a first current signal I1 representative of a current flowing through a first power switch of the IC switch device 101A-1, a second current signal I2 representative of a current flowing through a second power switch of the IC switch device 101A-2, a third current signal I3 representative of a current flowing through a third power switch of the IC switch device 101A-3. In a further embodiment, the current information unit 103 is further configured to provide a load current sensing signal ISEN representative of a load current of the multi-phase switching converter 100A. In one embodiment, the load current sensing signal ISEN is provided by summing, filtering and scaling up/out the current signals I1~I3.

The TSENS pin of the IC control device 102A is coupled to each VTEMP pin of the IC switch devices 101A-1~101A-3, to receive the temperature readings from the IC switch devices in a time-sharing manner. The temperature information unit 104 is coupled to the TSENS pin. And based on the temperature readings, the temperature information unit 104 is configured to provide a first temperature signal t1 representative of the temperature of the first IC switch device 101A-1, a second temperature signal t2 representative of the temperature of the second IC switch device 101A-2, and a third temperature signal t3 representative of the temperature of the third IC switch device 101A-3. In one embodiment, if the temperature of the IC switch device is above or below a predetermined safety temperature, then the temperature information unit 104 triggers an alarm, or report a fault condition, for example.

In the example shown in FIG. 2, the comparison circuit 105 is configured to receive the feedback voltage representative of the output voltage VOUT of the multi-phase switching converter 100A from the VOSEN pin. The comparison circuit 105 provides a comparison signal SET by comparing the feedback voltage with a reference voltage. The first ON-time control circuit 106 is configured to provide a first ON-time control signal ton1 to control the ON-time of the first power switch in the IC switch device 101A-1. In one embodiment, the ON-time of the firs power switch is constant. In another embodiment, the ON-time of the first power switch could be an adaptive value with the change of the input voltage VIN or the output voltage VOUT.

The second ON-time control circuit 107 is configured to provide a second ON-time control signal ton2 to control the ON-time of the second power switch in the IC switch device 101A-2, based on the first temperature signal t1, the second temperature signal t2, the first current signal I1, the second current signal I2 and the first ON-time control signal ton1. Similarly, the third ON-time control circuit 108 is configured to provide a third ON-time control signal ton3 to control the ON-time of the third power switch in the IC switch device 101A-3, based on the first temperature signal t1, the third temperature signal t3, the first current signal I1, the third current signal I3 and the first ON-time control signal ton1.

The switching control circuit 109 is coupled to the comparison circuit 105, the first ON-time control circuit 106, the second ON-time control circuit 107 and the third ON-time control circuit 108, and is configured to provide a first switching control signal PWM1 for controlling the first power switch in the IC switch device 101A-1, a second switching control signal PWM2 for controlling the second power switch in the IC switch device 101A-2, and a third switching control signal PWM3 for controlling the third power switch in the IC switch device 101A-3, based on the comparison signal SET, the first ON-time control signal ton1, the second ON-time control signal ton2 and the third ON-time control signal ton3. It should be noted that many alternative or additional functional relationships or physical connections may be present in an embodiment of the invention.

Figure 3:
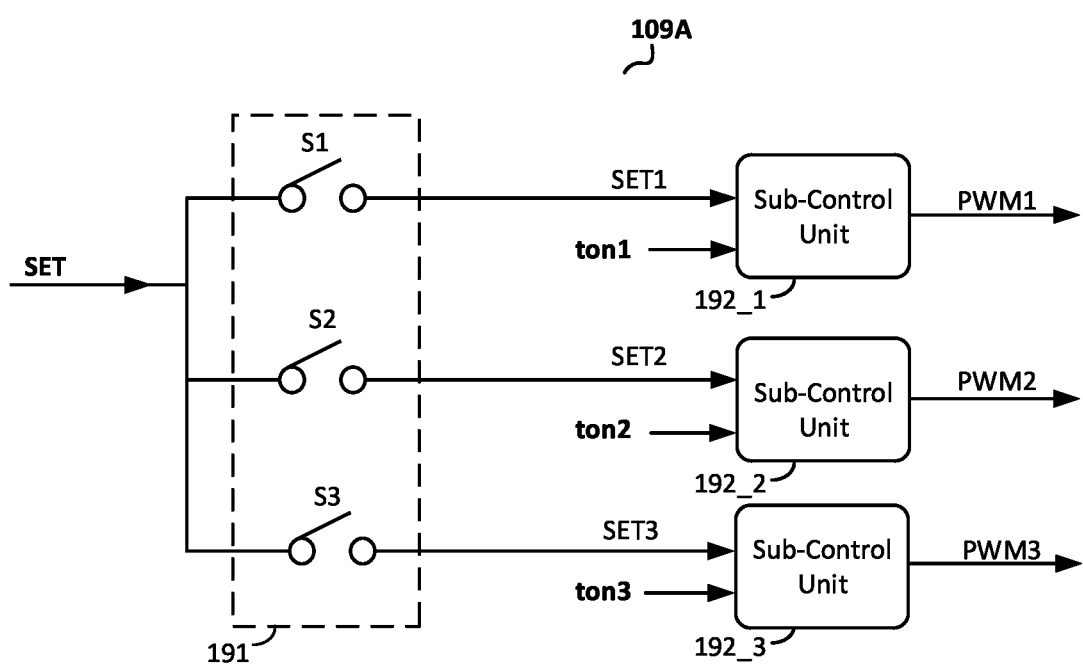
FIG. 3 shows a schematic diagram of a switching control circuit 109A in accordance with an embodiment of the present invention.

FIG. 3 shows a schematic diagram of a switching control circuit 109A in accordance with an embodiment of the present invention. As shown in FIG. 3, the switching control circuit 109A includes a frequency division unit 191 with switches S1~S3, and sub-control units (192_1, 192_29 and 192_3). The first terminals of the switches S1"S3 are connected together to receive the comparison signal SET. Each of the sub-control units (192_1~192_3) has a first input terminal, a second input terminal and an output terminal, wherein the first input terminal is coupled to the second terminal of the switch Si to receive the signal SETi, the second input terminal is coupled to the corresponding ON-time control circuit to receive the on-time control signal toni, and the output terminal is coupled to the IC switch device 101A-i to provide a switching control signal PWMi, wherein i=1, 2, 3, respectively.

The turning on and off of switches S1~S3 are determined by the number and timing sequence of the IC switch devices 101A-1~101A-3 currently under power operation. When the switch Si is turned on, the comparison signal SET is sent into the sub-control unit 192_i to control the power switch in the switch device 101A-i, wherein i=1, 2, 3, respectively.

Referring still to FIG. 2, under the control of the switching control signal PWM1~PWM3, the IC switch devices under the power operation will operate with phase interleaving, and a shift degree among the phases is 360 degree divided by the number (i.e. 3) of the switch devices currently under the power operation.

In the example shown in FIG. 2, the plurality of switching phases 101A comprises three IC switch devices (101A-1~101A-3) to form a three-phase switching converter. As can be appreciated, the plurality of switching phases 101 can also include switch devices with any number to form any other multi-phase switching converter.

In another embodiment, the plurality of switching phases 101A comprises a master phase (e.g., 101A-1) and at least one slave phase (e.g., 101A-2~101A-N). In one embodiment, when the multi-phase switching converter enters phase shedding operation from the power operation, based on the load current sensing signal ISEN, the number of the slave phases under power operation will change. In one embodiment, when the load current sensing signal ISEN is small, there could be only part of the plurality of switching phases 101A entering into power operation, while the rest cease to receive the switching control signal and do not supply power and output voltage to the load. If a transient rise of the load current has occurred, the IC control device 102A could control all the plurality of switching phases 101A to enter the power operation.

Figure 4:
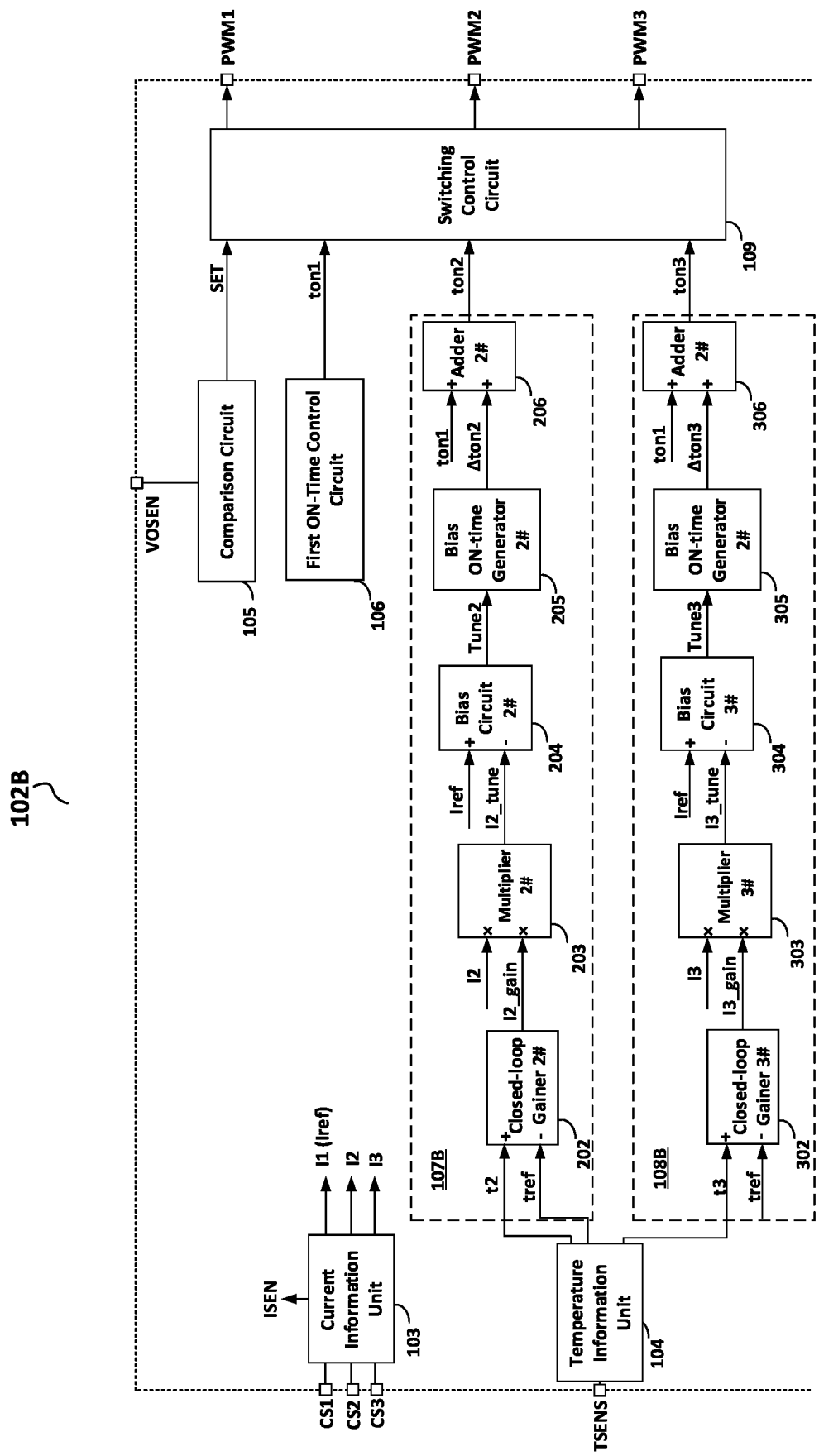
FIG. 4 shows a schematic diagram of an integrated circuit (IC) control device 102B in accordance with an embodiment of the present invention.

FIG. 4 shows a schematic diagram of an integrated circuit (IC) control device 102B in accordance with an embodiment of the present invention. As shown in FIG. 4, the second ON-time control circuit 107B comprises a second closed-loop gainer 202, a second multiplier 203, a second bias circuit 204, a second bias ON-time generator 205 and a second adder 206.

As shown in FIG. 4, the second closed-loop gainer 202 is configured to provide a second gain I2_gain by executing proportional integral operation to a difference between the first temperature signal t1 configured as a temperature reference signal tref and the second temperature signal t2. The second multiplier 203 is configured to multiply the second current signal I2 with the second gain I2_gain and provide a second current feedback signal I2_tune. The second bias circuit 204 is configured to provide a second bias Tune2 by executing proportional integral operation to a difference between the first current signal I1 configured as a current reference signal Iref and the second current feedback signal I2_tune. The second bias ON-time generator 205 is configured to provide a second bias ON-time control signal Δton2 based on the second bias Tune2. The second adder 206 is configured to add the first ON-time control signal ton1 to the second bias ON-time control signal Δton2 and provide the second ON-time control signal ton2.

Similarly, referring still to FIG. 4, the third ON-time control circuit 108B comprises a third closed-loop gainer 302, a third multiplier 303, a third bias circuit 304, a third bias ON-time generator 305 and a third adder 306. The third closed-loop gainer 302 is configured to provide a third gain I3_gain by executing proportional integral operation to a difference between the first temperature signal t1 and the third temperature signal t3. The third multiplier 303 is configured to multiply the third current signal I3 with the third gain I3_gain and provide a third current feedback signal I3_tune. The third bias circuit 304 is configured to provide a third bias Tune3 by executing proportional integral operation to a difference between the first current signal I1 and the third current feedback signal I3_tune. The third bias ON-time generator 305 is configured to provide a third bias ON-time control signal Δton3 based on the third bias Tune3. The third adder 306 is configured to add the first ON-time control signal ton1 to the third bias ON-time control signal Δton3 and provide the third ON-time control signal ton3.

Figure 5:
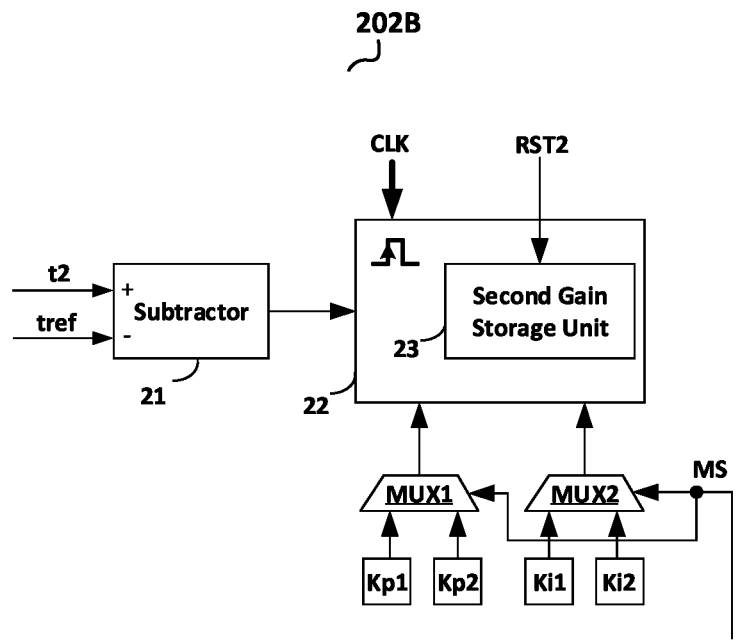
FIG. 5 shows a schematic diagram of a second closed-loop gainer 202B in accordance with an embodiment of the present invention.

FIG. 5 shows a schematic diagram of a second closed-loop gainer 202B in accordance with an embodiment of the present invention. As shown in FIG. 5, the second closed-loop gainer 202B comprises a subtractor 21 and a proportional integral (PI) controller 22. The subtractor 21 has a first input terminal, a second input terminal and an output terminal, wherein the first input terminal is configured to receive a second temperature signal t2, the second input terminal is configured to receive the temperature reference signal tref. The subtractor 21 provides a difference between the second temperature signal t2 and the temperature reference signal tref at the output terminal. The PI controller 22 is configured to provide a second gain I2_gain by executing proportional integral operation under the control of a first clock signal CLK. The PI controller 22 executes the proportional integral operation based on an input state of the first clock signal CLK to provide the second gain I2_gain, and the second gain I2_gain is stored in a second gain storage unit 23 included in the PI controller 22. In one embodiment, the temperature reference signal tref is the first temperature signal t1. A proportional gain factor Kp and an integral gain factor Ki can be used as the control parameters to meet certain design constraints (e.g., fast response time, no oscillation). At least one from among the proportional gain factor Kp and the integral gain factor Ki to set for the PI controller 22 is switched to different values according to switching among different working modes through multiplexers MUX1 and MUX2. In one embodiment, a mode signal MS is switched to a high level when the switch device 101A-2 is under a first mode, and Kp1 and Ki1 will be selected to set the PI controller 22. In another embodiment, the mode signal MS is switched to a low level when the switch device 101A-2 is under a second mode, and Kp2 and Ki2 will be selected to set the PI controller 22.

When the operating conditions change suddenly from a heavy load condition to no load condition, part of IC switch devices enters the phase shedding operation, if the IC control device 102A still adjusts a current balance inner loop according to the temperature readings from all the switch devices, which often leads to mismatch problems, and poor efficiency due to unnecessary power loss. For such conditions, when the second switch device 101A-2, for example, enters the phase shedding operation from the power operation, a second reset signal RST2 which is disabled to a high level in a normal state and transitions to a low level and is thus enabled for resetting. In one embodiment, the second gain I2_gain stored in the second gain storage unit 23 is reset to a first value, e.g., utility gain.

Figure 6:
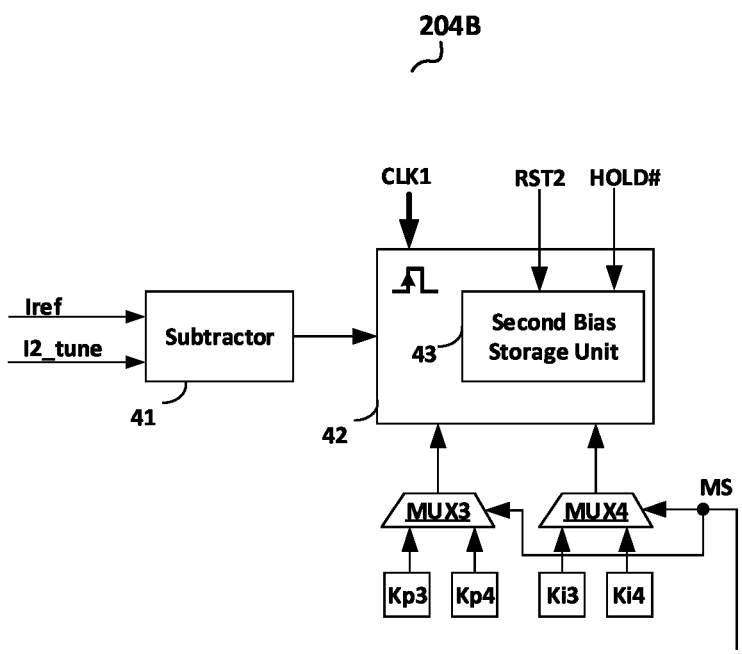
FIG. 6 shows a schematic diagram of a second bias circuit 204B in accordance with an embodiment of the present invention.

FIG. 6 shows a schematic diagram of a second bias circuit 204B in accordance with an embodiment of the present invention. As shown in FIG. 4, the second bias circuit 204B comprises a subtractor 41 and a PI controller 42. The subtractor 41 has a first input terminal, a second input terminal and an output terminal, wherein the first input terminal is configured to receive the second current feedback signal I2_tune, the second input terminal is configured to receive the current reference signal Iref. In one embodiment, the first current signal I1 can be used as the current reference signal Iref. The subtractor 41 provides a difference between the second current feedback signal I2_tune and the current reference signal Iref at the output terminal. The PI controller 42 is configured to provide a second bias Tune2 by executing proportional integral operation to the difference under the control of a second clock signal CLK1. The PI controller 42 executes the proportional integral operation based on the control of the second clock signal CLK1 to generate the second bias Tune2, and the second bias Tune2 is stored in a second bias storage unit 43 included in the PI controller 42. In one embodiment, the frequency of the first clock signal CLK is less than that of the second clock signal CLK1. Similarly, at least one from among the proportional gain factor Kp and the integral gain factor Ki to set for the PI controller 42 is switched to different values according to switching among different working modes through multiplexers MUX3 and MUX4. In one embodiment, the mode signal MS is switched to the high level when the switch device 101A-2 is under the first mode, and Kp3 and Ki3 will be selected to set the PI controller 42. In another embodiment, the mode signal MS is switched to the low level when the switch device 101A-2 is under the second mode, and Kp4 and Ki4 will be selected to set the PI controller 42.

In addition, when the second switch device 101A-2, for example, enters the phase shedding operation from the power operation, the second reset signal RST2 which is disabled to the high level in a normal state and transitions to the low level and is thus enabled for resetting the second bias Tune2 stored in the second gain storage unit 23 to a second value (e.g., 0).

Accordance to the embodiments of the present invention, each ON-time control circuit for a corresponding slave phase is configured to provide a temperature balance loop as an outer loop of the current balance inner loop. The temperature balance outer loop is configured to regulate the current feedback signal by adjusting the gain provided by the closed-loop gainer. The current feedback signal is inputted into the current balance inner loop. In response to the slave phase under the power operation, the corresponding temperature balance outer loop is enabled to affect the current balance inner loop. In response to the slave phase under the phase shedding operation, the gain provided by the corresponding closed-loop gainer is reset to utility gain, and thus the current feedback signal equals to the corresponding current signal, to eliminate the effect of temperature balance outer loop to the current balance inner loop. In summary, whether the multi-phase switching converter switches to the power operation or phase shedding operation, the thermal balance of the multi-phase switching converter 100A can be achieved automatically and adaptively.

In a further embodiment, the second bias circuit 204B further receives a hold signal HOLD #. In a normal state, the hold signal HOLD # is disabled to a high level and is enabled to a low level for locking/holding the second bias Tune2. In one embodiment, when the hold signal HOLD # is enabled in an abnormal case, the second bias Tune2 stored in the second bias storage unit 43 is kept unchanged. The second bias Tune2 is kept to be the value updated at the current clock cycle of the second clock signal CLK2 when the hold signal HOLD # is enabled, and is irrelevant to the result of the PI operation executed in the PI controller 42 after the current clock cycle of the second clock signal CLK2.

In one embodiment, the hold signal HOLD # is enabled to the low level when any of the following occurs: a load transient, the number of the switching phases under power operation has changed; or a Voltage identification (VID) code provided to the load (e.g., a processor) has changed, and the second bias Tune 2 stored in the second bias storage unit 43 is kept unchanged and is maintained at the value updated at the current clock cycle of the second clock signal CLK2 when the hold signal HOLD # is enabled.

Figure 7:
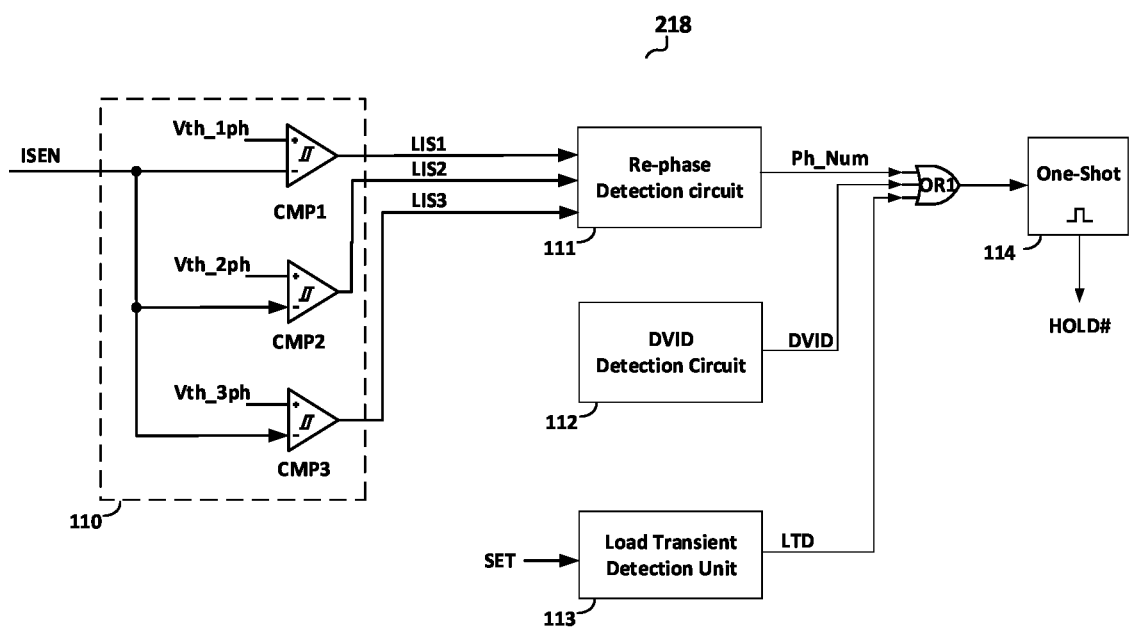
FIG. 7 shows a schematic diagram of a hold signal providing circuit 218 in accordance with an embodiment of the present invention.

In one embodiment, the IC control device 102A further comprises a hold signal providing circuit 218. FIG. 7 shows a schematic diagram of the hold signal providing circuit 218 in accordance with an embodiment of the present invention.

As shown in FIG. 7, the hold signal providing circuit 218 comprises a load current comparison unit 110, a re-phase detection circuit 111, a dynamic VID detection circuit 112, a load transient detection circuit 113, an OR gate circuit OR1 and an one-shot circuit 114.

In the example of FIG. 7, the load current comparison unit 110 is coupled to the current information unit 103 to receive the load current sensing signal ISEN, and compares the load current sensing signal ISEN respectively with a plurality of threshold voltages (e.g., $Vth\_1ph$, $Vth\_2ph$ and $Vth\_3ph$) to generate a plurality of current comparison signals (LIS1, LIS2 and LIS3). The load current comparison unit 110 comprises hysteresis comparators CMP1~CMP3, connected as shown in the FIG. 7. The comparators CMP1~CMP3 compare the load current sensing signal ISEN with threshold voltage $Vth\_1ph$, $Vth\_2ph$ and $Vth\_3ph$, respectively, to determine the number of IC switch devices (also called switching phases) for power operation. In an example, when $Vth\_3ph+VHYS<ISEN$, the three switch devices 101A-1~101A-3 all work in current continuous mode (CCM), and wherein VHYS is a hysteresis voltage. When $Vth\_2ph+VHYS<ISEN\leq Vth\_3ph$, the switch devices 101A-1 and 101A-2 work in CCM, and the switch device 101A-3 is disabled. When $Vth\_1ph+VHYS<ISEN\leq Vth\_2ph$, the switch device 101A-1 works in CCM, and the rest switch devices 101A-2 and 101A-3 are disabled. When $ISEN\leq Vth\_1ph$, the switch device 101A-1 works in current discontinuous mode (DCM), and the rest switch device 101A-2 and 101A-3 are disabled.

In the example shown in FIG. 7, the re-phase detection circuit 111 is configured to determine if the number of the switching phases under power operation has changed, to provide a phase number change signal Ph_Num based on the determination. The phase number change signal Ph_Num is enabled to a high level for indicating this change of switching phases under power operation.

In a computer system, the operating voltage supplied to a processor, such as a central process unit (CPU) or graphic process unit (GPU), is determined by a dynamic VID code produced based on the requirement of the processor. When the VID code provided to the load (e.g., a processor) has changed, the dynamic VID detection circuit 112 provides a dynamic VID signal DVID which is enabled to a high level for indicating the VID code change.

A load transient event can be caused within the switching converter by changes in the load current. The load transient detection circuit 113 is coupled to the comparison circuit 103 to receive the comparison signal SET, and it provides a transient detection signal LTD to determine whether the load transient has occurred based on the comparison signal SET. In one embodiment, the load transient detection circuit 113 detects a period of the comparison signal SET, compares the detected period with a time threshold during every cycle of the comparison signal SET to generate a time comparison signal, and counts and generates a counting value based on the time comparison signal. If the counting value reaches a predetermined value, which means that the detected period is smaller than the time threshold in multiple successive cycles, the transient detection signal LTD will be enabled to a high level for indicating the load transient.

The OR gate circuit OR1 has a first input terminal, a second input terminal, a third input terminal and an output terminal, wherein the first input terminal is coupled to the re-phase detection circuit 111 to receive the phase number change signal Ph_Num, the second input terminal is coupled to the DVID detection circuit 112 to receive the dynamic VID signal DVID, the third input terminal is coupled to the load transient detection circuit 113 to receive the transient detection signal LTD. In one embodiment, when the number of switching phases under power operation has changed, the VID code provided to the load has changed, or the load transient has occurred, the one-shot circuit 114 is triggered to provide the hold signal HOLD #which is enabled to the low level. Accordingly, the second bias Tune2 stored in the second bias storage unit 43 is kept unchanged to be the bias value based on the current lock cycle of the second clock signal CLK2 when the hold signal HOLD #is enabled.

Figure 8:
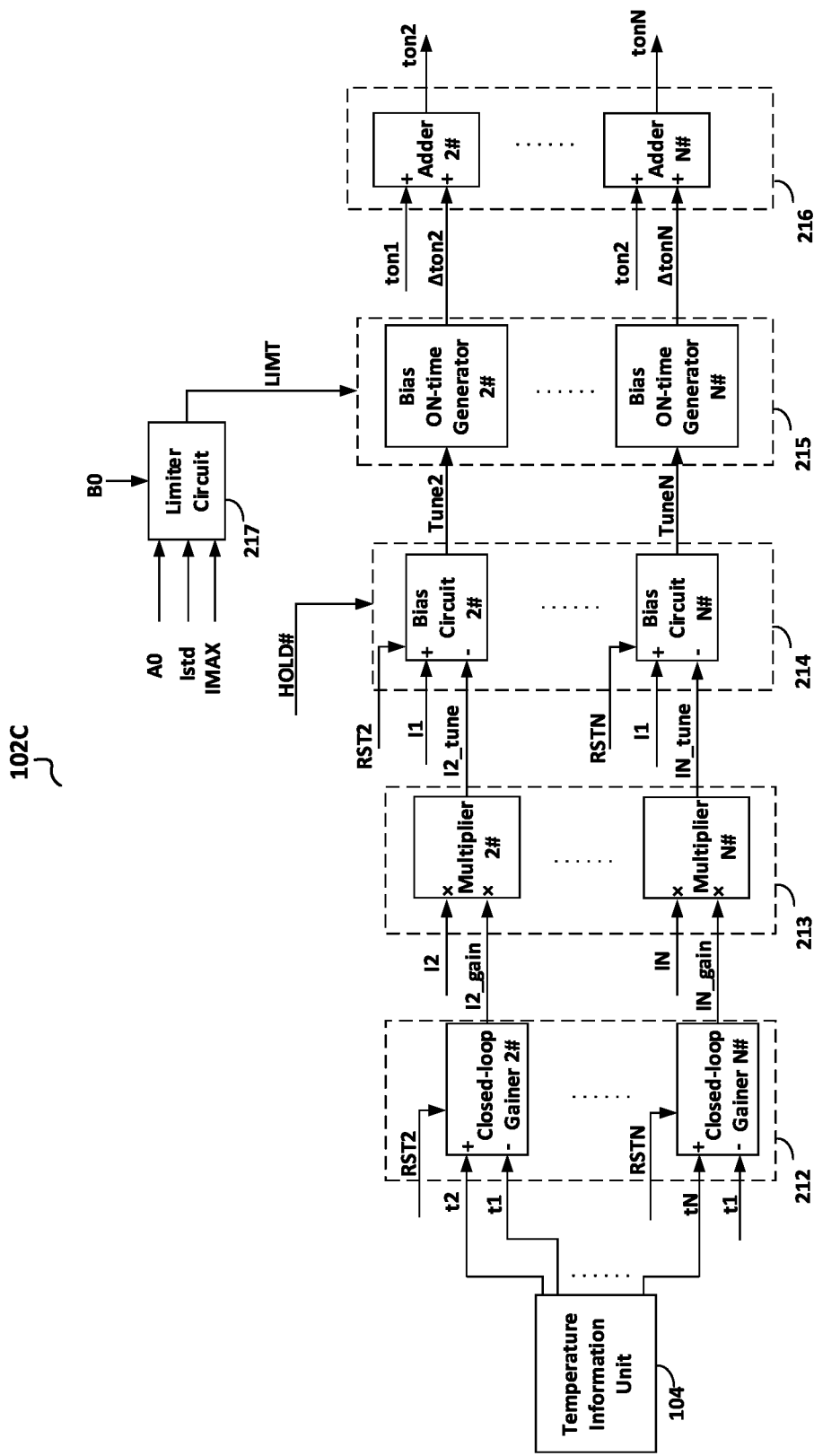
FIG. 8 shows a schematic diagram of an IC control device 102C in accordance with an embodiment of the present invention.

FIG. 8 shows a schematic diagram of an IC control device 102C in accordance with an embodiment of the present invention. In one embodiment, the multi-phase switching converter has a plurality of switching phases coupled in parallel for converting an input voltage to an output voltage for a load, wherein the plurality of switching phases have a master phase (e.g., IC switch device 101-1) and N−1 slave phases (e.g., IC switch devices 101-2~101-N). The IC control device 102C comprises the current information unit 103, the temperature information unit 104, the comparison circuit 105, the first ON-time control circuit 106 configured as a master ON-time control circuit, which are all discussed above. The IC control device 102C further comprises N−1 slave ON-time control circuits that comprise N−1 closed-loop gainers 212, N−1 multipliers 213, N−1 bias circuits 214, N−1 bias ON-time generators 215 and N−1 adders 216.

In the example of FIG. 8, each of the N−1 closed-loop gainers 212 has a first input terminal, a second input terminal, wherein the first input terminal is configured to receive the temperature reference signal tref, the second input terminal is configured to receive a corresponding slave temperature signal ti, wherein 1<i≤N. Each of N−1 closed-loop gainers 212 is configured to provide a gain Ii_gain by executing the proportional integral operation to a difference between the temperature reference signal tref and a slave temperature signal ti representative of the corresponding slave phase temperature. In one embodiment, the temperature reference signal tref comprises the first temperature signal t1 representative of the master phase temperature. In another embodiment, at least one of the N−1 closed-loop gainers 212 executes the proportional integral operation under the control of the first clock signal CLK, and provides the bias stored in the corresponding gain storage unit. In yet another embodiment, when the IC switch device 101-i enters the phase shedding operation from the power operation, a reset signal RSTi which is disabled to a high level in a normal state and transitions to a low level and is thus enabled for resetting. In one embodiment, the gain Ii_gain stored in the corresponding gain storage unit is reset to a default value, e.g., utility gain.

In the example of FIG. 8, each of the N−1 multipliers 213 is configure to multiply the current signal Ii with the gain Ii_gain and provide a current feedback signal Ii_tune.

Each of the N−1 bias circuits 214 is configured to provide a bias Tunei by executing the proportional integral operation to a difference between the first current signal I1 and the current feedback signal Ii_tune. In one embodiment, at least one of the N−1 bias circuits 214 executes the proportional integral operation under the control of the second clock signal CLK1, and provides the bias Tunei stored in the corresponding bias storage unit. Wherein the frequency of the first clock signal CLK is less than that of the second clock signal CLK1.

In one embodiment, the hold signal HOLD #is enabled to the low level when any of the following occurs: the load transient, the number of the switching phases under the power operation for providing the output voltage has changed; or a VID code supplied to the load has changed, and the bias Tunei is kept unchanged and is maintained at the value updated at the last clock cycle of the second clock signal CLK2 when the hold signal HOLD #is enabled.

Each of the N−1 bias ON-time generator 215 is configured to provide a bias ON-time control signal Δtoni based on the bias Tunei. In one embodiment, the bias ON-time control signal Δtoni could be a positive value, also can be a negative value. Each of the N−1 adders 216 is configured to add the first ON-time control signal ton1 to the bias ON-time control signal Δtoni and provide the ON-time control signal toni, wherein 1<i≤N.

The IC control device 102C further comprise a switching control circuit. The switching control circuit is coupled to the comparison circuit 105, the first ON-time control circuit 106, and the N−1 adders 216, and provides N switching control signals PWM1~PWMN successively to control the power switch in each of the N switching phases.

In some situations, the load current of the multiphase switching converter 100A changes frequently, the ON-time of the power switch of switching phases will be unexpectedly too long, resulting in overheating of the IC switch devices. Which often leads to thermal problems at the high load currents, and thermal balance fails over time.

In the example shown in FIG. 8, the IC control device 102C further comprises a limiter circuit 217 to provide an allowable output range LIMT to limit the variation of the ON-time of the power switch in each of the N−1 slave phases.

As shown in FIG. 8, the limiter circuit 217 is coupled to the current information unit 103 shown in FIG. 2 to receive load current information that include a standardized load current value Istd, a preset load current maximum value Imax, a gain factor A0 and a bias factor B0. The limiter circuit 217 adaptively provides the allowable output range LIMT based on the load current information. In one embodiment, a maximum value of the output range LIMT is not more than a sum of the gain factor A0 and the bias factor B0. In another embodiment, a minimum value of the output range LIMT is not less than the bias factor B0.

As shown in FIG. 8, the N−1 bias ON-time generators 215 is coupled to the limiter circuit 217 to receive the output range LIMT for limiting an absolute value of the bias ON-time control signal Δtoni, such that the absolute value of Δtoni is constrained to not more than the output range LIMT. Therefore, the variation of the ON-time adjusted by the current balance inner loop is adaptively limited by the limiter circuit 217 with load current information, to improve the performance of the thermal balance among the switching phases.

Figure 9:
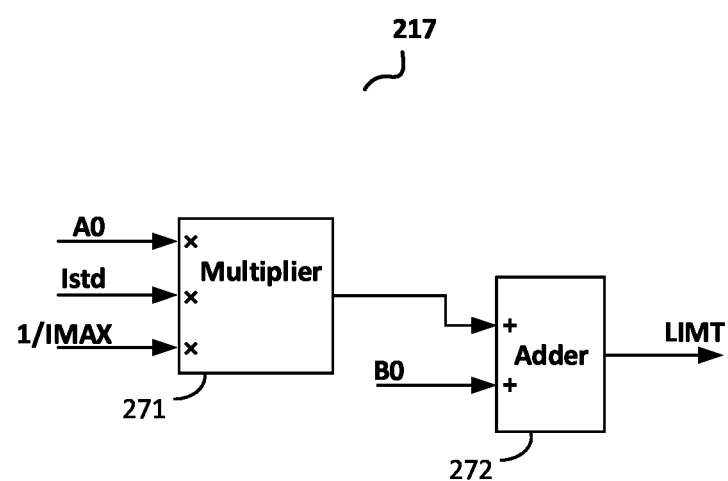
FIG. 9 shows a schematic diagram of a limiter circuit 217 shown in FIG. 8 in accordance with an embodiment of the present invention.

FIG. 9 shows a schematic diagram of a limiter circuit 217 shown in FIG. 8 in accordance with an embodiment of the present invention. As shown in FIG. 9, the limiter circuit 217 comprises a multiplier 271 and an adder 272. The multiplier 271 provides the product of the standardized load current value Istd, an inverse of the preset load current maximum value Imax and the gain factor A0. The adder 272 adds the product up to the bias factor B0, and provides the output range LIMT to the N−1 bias ON-time generators 215. In one embodiment, the output range LIMT is adaptively generated by Istd/Imax*A0+B0.

Figure 10:
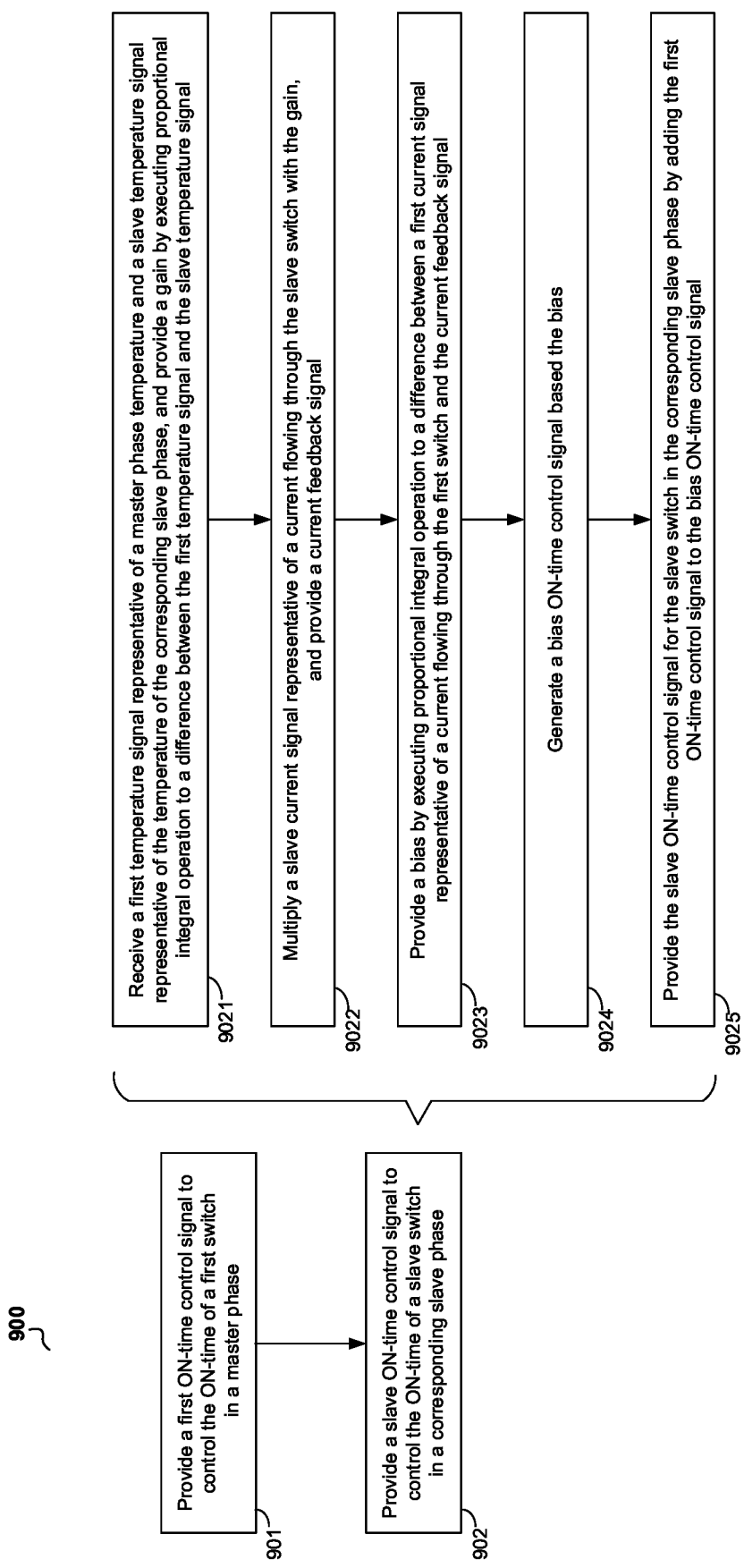
FIG. 10 illustrates a flow diagram of a control method 900 of a multi-phase switching converter in accordance with an embodiment of the present invention.

FIG. 10 illustrates a flow diagram of a control method 900 of a multi-phase switching converter in accordance with an embodiment of the present invention. The multi-phase switching converter has a plurality of switching phases coupled in parallel for providing an output voltage to a load, wherein the plurality of switching phases has a master phase and at least one slave phase. The control method 900 comprises steps 901 and 902.

At step 901, a first ON-time control signal is provided to control the ON-time of a first switch in the master phase.

At step 902, a respective slave ON-time control signal is provided to control the ON-time of a slave switch in each slave phase. Wherein in each slave phase, the step 902 further comprises steps 9021-9025.

At step 9021, a first temperature signal representative of a master phase temperature and a slave temperature signal representative of the temperature of the corresponding slave phase are received, and then a gain is provided by executing proportional integral operation to a difference between the first temperature signal and the slave temperature signal.

In one embodiment, the proportional integral operation is executed under the control of a first clock signal to generate the gain, and the gain is stored in a corresponding gain storage unit.

In another embodiment, each slave ON-time control circuit under a phase-shedding operation is configured to reset the gain stored in the corresponding gain storage unit to be a first value (e.g., utility gain).

At step 9022, a product of a slave current signal representative of a current flowing through the slave phase and the gain is provided as a current feedback signal.

At step 9023, a bias is provided by executing proportional integral operation to a difference between a first current signal representative of a current flowing through the first switch and the current feedback signal.

In one embodiment, the proportional integral operation is executed under the control of a second clock signal to generate the bias, and the bias is stored in a corresponding bias storage unit. The first clock signal has a lower frequency than that of the second clock signal.

In another embodiment, each slave ON-time control circuit under a phase-shedding operation is configured to reset the bias stored in the corresponding bias storage unit to be a second value (e.g., 0).

At step 9024, a bias ON-time control signal is generated based on the bias.

At step 9025, the slave ON-time control signal for the slave switch in the corresponding slave phase is provided by adding the first ON-time control signal to the bias ON-time control signal.

In one embodiment, the method 902 further comprises: the bias stored in the bias storage unit is kept unchanged when any of the following occurs: a load transient, the number of the switching phases under power operation has changed, or a VID code supplied to the load (e.g., a processor) has changed.

In another embodiment, the method 902 further comprises: an output range is provided based on load current information such that the variation of the ON-time of the slave switch in each slave phase is not more than the output range.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. An integrated circuit (IC) control device to be used in a multi-phase switching converter, the IC control device comprising:
    a first pin configured to receive a first temperature signal representative of a temperature of a first phase of the multi-phase switching converter and a second temperature signal representative of a temperature of a second phase of the multi-phase switching converter;
    a second pin configured to receive a first current signal representative of a current flowing through the first phase of the multi-phase switching converter;
    a third pin configured to receive a second current signal representative of a current flowing through the second phase of the multi-phase switching converter;
    a comparison circuit configured to provide a comparison signal by comparing a feedback voltage representative of an output voltage of the multi-phase switching converter with a reference voltage;
    a first ON-time control circuit configured to provide a first ON-time control signal to control an ON-time of a first switch of the first phase of the multi-phase switching converter; and
    a second ON-time control circuit configured to provide a second ON-time control signal to control an ON-time of a second switch of the second phase of the multi-phase switching converter based on the first temperature signal, the second temperature signal, the first current signal, the second current signal and the first ON-time control signal.

2. The IC control device of claim 1, further comprises:
    a fourth pin configured to receive a third current signal representative of a current flowing through a third switch of a third phase of the multi-phase switching converter; and
    a third ON-time control circuit configured to provide a third ON-time control signal to control an ON-time of the third switch based on the first temperature signal, a third temperature signal representative of a temperature of the third phase, the first current signal, the third current signal and the first ON-time control signal.

3. The IC control device of claim 1, wherein the second ON-time control circuit comprises:
    a second closed-loop gainer configured to provide a second gain by executing proportional integral operation to a difference between the first temperature signal and the second temperature signal;
    a second multiplier configured to multiply the second current signal with the second gain and provide a second current feedback signal;
    a second bias circuit configured to provide a second bias by executing proportional integral operation to a difference between the first current signal and the second current feedback signal;
    a second bias ON-time generator configured to provide a second bias ON-time control signal based on the second bias; and
    a second adder configured to add the first ON-time control signal to the second bias ON-time control signal and provide the second ON-time control signal.

4. The IC control device of claim 3, wherein:
    the second closed-loop gainer is configured to execute proportional integral operation under a control of a first clock signal to generate the second gain, and the second gain is stored in a second gain storage unit; and the second bias circuit is configured to execute proportional integral operation under a control of a second clock signal to generate the second bias, and the second bias is stored in a second bias storage unit, wherein the first clock signal has a lower frequency than that of the second clock signal.

5. The IC control device of claim 4, wherein when the second phase enters to phase shedding operation from power operation, the second gain is reset to be a first value and the second bias is reset to be a second value.

6. The IC control device of claim 4, wherein the second ON-time control circuit is further configured to keep the second bias stored in the second bias storage unit unchanged when any of the following occurs:
a load transient has occurred;
a number of switching phases of the multi-phase switching converter under power operation has changed; or
a Voltage identification (VID) code to a load has changed.

7. The IC control device of claim 3, wherein the second ON-time control circuit further comprises:
a limiter circuit configured to provide an output range to the second bias ON-time generator, such that an absolute value of the second bias ON-time control signal is not more than the output range.

8. The IC control device of claim 7, wherein:
the output range provided by the limiter circuit is generated based on a gain factor and a bias factor, wherein a maximum value of the output range is not more than a sum of the gain factor and the bias factor, and a minimum value of the output range is not less than the bias factor.

9. A control device to be used in a multi-phase switching converter having a plurality of switching phases coupled in parallel for providing an output voltage to a load, the control device comprising:
a master ON-time control circuit configured to provide a first ON-time control signal to control an ON-time of a first switch in a master phase of the multi-phase switching converter;
a comparison circuit configured to provide a comparison signal by comparing a feedback voltage representative of the output voltage of the multi-phase switching converter with a reference voltage; and
at least one slave ON-time control circuit, each slave ON-time control circuit is configured to provide a respective slave ON-time control signal to control an ON-time of a slave switch in a corresponding slave phase of the multi-phase switching converter based on a master phase temperature of the master phase of the multi-phase switching converter, a corresponding slave phase temperature of the corresponding slave phase of the multi-phase switching converter, a first current flowing through the master phase of the multi-phase switching converter, a second current flowing through the corresponding slave phase of the multi-phase switching converter, and the first ON-time control signal.

10. The control device of claim 9, wherein each slave ON-time control circuit comprises:
a closed-loop gainer configured to provide a gain by executing proportional integral operation to a difference between a first temperature signal representative of the master phase temperature and a slave temperature signal representative of the corresponding slave phase temperature;

a multiplier configured to multiply a slave current signal representative of the second current flowing through the slave switch in the corresponding slave phase with the gain, and provide a current feedback signal;
a bias circuit configured to provide a bias by executing proportional integral operation to a difference between a first current signal representative of the first current flowing through the first switch and the current feedback signal;
a bias ON-time generator configured to generate a bias ON-time control signal based the bias; and
an adder configured to add the first ON-time control signal to the bias ON-time control signal and provide the respective slave ON-time control signal for the slave switch in the corresponding slave phase.

11. The control device of claim 10, wherein:
each closed-loop gainer is configured to execute proportional integral operation under a control of a first clock signal to generate the gain which is stored in a corresponding gain storage unit; and
each bias circuit is configured to execute proportional integral operation under a control of a second clock signal to generate the bias which is stored in a corresponding bias storage unit, and wherein the first clock signal has a lower frequency than that of the second clock signal.

12. The control device of claim 11, wherein each slave ON-time control circuit under a phase-shedding operation is configured to reset the gain stored in the corresponding gain storage unit to be a first value and reset the bias stored in the corresponding bias storage unit to be a second value.

13. The control device of claim 11, wherein each slave ON-time control circuit is further configured to keep the bias stored in the corresponding bias storage unit unchanged when any of the following occurs:
a load transient;
a number of the plurality of switching phases of the multi-phase switching converter under power operation has changed; or
a VID code provided to the load has changed.

14. The control device of claim 11, wherein each slave ON-time control circuit further comprises:
a limiter circuit configured to provide an output range to the bias ON-time generator, such that an absolute value of the bias ON-time control signal is not more than the output range.

15. The control device of claim 14, wherein:
the output range provided by the limiter circuit is generated based on a gain factor and a bias factor, wherein a maximum value of the output range is not more than a sum of the gain factor and the bias factor, and a minimum value of the output range is not less than the bias factor.

16. The control device of claim 9, further comprises:
a switching control circuit coupled to the comparison circuit and configured to successively provide a plurality of switching control signals to the plurality of switching phases based on the comparison signal, the first ON-time control signal and at least one slave ON-time control signal.

17. A control method used in a multi-phase switching converter having a plurality of switching phases including a master phase and at least one slave phase, the control method comprising:
providing a first ON-time control signal to control an ON-time of a first switch in the master phase of the multi-phase switching converter;

providing a respective slave ON-time control signal to control an ON-time of a slave switch in each slave phase of the at least one slave phase of the multi-phase switching converter, wherein in each slave phase:

receiving a first temperature signal representative of a master phase temperature of the master phase of the multi-phase switching converter and a slave temperature signal representative of a temperature of a corresponding slave phase of the at least one slave phase of the multi-phase switching converter, and providing a gain by executing proportional integral operation to a difference between the first temperature signal and the slave temperature signal;

multiplying a slave current signal representative of a current flowing through the slave switch with the gain, and provide a current feedback signal;

providing a bias by executing proportional integral operation to a difference between a first current signal representative of a current flowing through the first switch and the current feedback signal;

generating a bias ON-time control signal based on the bias; and providing the respective slave ON-time control signal for the slave switch in the corresponding slave phase by adding the first ON-time control signal to the bias ON-time control signal.

18. The control method of claim 17, wherein for each slave phase:

executing proportional integral operation under a control of a first clock signal to generate the gain stored in a corresponding gain storage unit; and executing proportional integral operation under a control of a second clock signal to generate the bias stored in a corresponding bias storage unit, and wherein the first clock signal has a lower frequency than that of the second clock signal.

19. The control method of claim 18, further comprising keeping each bias stored in the corresponding bias storage unit unchanged when any of the following occurs:

a load transient has occurred;

a number of the plurality of switching phases of the multi-phase switching converter under power operation has changed; or a VID code provided to a load has changed.

20. The control method of claim 17, wherein for each slave phase:

providing an output range based on load current information such that a variation of the ON-time of the slave switch in each slave phase is not more than the output range.

* * * * *